US007583346B2

(12) United States Patent
Hsieh et al.

(10) Patent No.: US 7,583,346 B2
(45) Date of Patent: Sep. 1, 2009

(54) MULTI-DOMAIN VERTICAL ALIGNMENT LIQUID CRYSTAL DISPLAY

(75) Inventors: Ming-Feng Hsieh, Tainan (TW);
Chih-Yung Hsieh, Tainan (TW);
Che-Ming Hsu, Tainan (TW);
Chien-Hong Chen, Tainan (TW)

(73) Assignee: Chi Mei Optoelectronics, Corp., Tainan County (TW)

( * ) Notice: Subject to any disclaimer, the term of this patent is extended or adjusted under 35 U.S.C. 154(b) by 204 days.

(21) Appl. No.: 11/726,108

(22) Filed: Mar. 21, 2007

(65) Prior Publication Data
US 2007/0236637 A1 Oct. 11, 2007

(30) Foreign Application Priority Data
Mar. 22, 2006 (TW) .............................. 95109794 A

(51) Int. Cl.
*G02F 1/1337* (2006.01)
(52) U.S. Cl. ..................... 349/129; 349/142; 349/143
(58) Field of Classification Search ................ 349/128, 349/129
See application file for complete search history.

(56) References Cited

U.S. PATENT DOCUMENTS

| 6,300,996 | B1 * | 10/2001 | Matsuyama et al. | 349/144 |
| 7,405,790 | B2 * | 7/2008 | Shih et al. | 349/129 |
| 2006/0146241 | A1 * | 7/2006 | Choi et al. | 349/129 |
| 2007/0206141 | A1 * | 9/2007 | Lu et al. | 349/129 |

OTHER PUBLICATIONS

Willem de Boer, "Vertical Alignment," pp. 157-162, *Active Matrix Liquid Crystal Display: Fundamentals and Applications*, Newnes (2005).

* cited by examiner

*Primary Examiner*—Richard H Kim
(74) *Attorney, Agent, or Firm*—Trop, Pruner & Hu, P.C.

(57) ABSTRACT

A multi-domain vertical alignment liquid crystal display (MVA-LCD) panel includes an active element array substrate, an opposite substrate, and a liquid crystal layer disposed between the two substrates. The active element array substrate has scan lines, data lines, active elements, and pixel electrodes formed thereon. Each pixel electrode has first main slits. The first main slits may have a bent configuration. The opposite substrate has a common electrode layer that faces the active element array substrate. The common electrode layer has second main slits. The second main slits may also have a bent configuration.

19 Claims, 14 Drawing Sheets

MULTI-DOMAIN VERTICAL ALIGNMENT LIQUID CRYSTAL DISPLAY

CROSS-REFERENCE TO RELATED APPLICATION

This claims priority under 35 U.S.C. §119 of Taiwan Application No. 095109794, filed Mar. 22, 2006.

TECHNICAL FIELD

The present invention relates generally to display panels, and more particularly to multi-domain vertical alignment (MVA) liquid crystal display panels.

BACKGROUND

Advances in fabrication technologies for semiconductors and display apparatus have led to the rapid development of multi-media. In fact, thin-film transistor liquid crystal displays (TFT-LCDs) have gradually dominated the display market due to their high picture quality, better spatial utilization rate, low power consumption, and radiation-free operation.

At present, a liquid crystal display in the marketplace may have a high contrast ratio, no gray scale inversion, low color shift, high luminance, wide color gamut, high color saturation, rapid response time, and a wide viewing angle. The techniques currently capable of providing a wide viewing angle include twisted nematic (TN) liquid crystals together with a wide viewing film, in-plane switching (IPS) liquid crystal display, fringe field switching liquid crystal display, and multi-domain vertical alignment (MVA) liquid crystal display (LCD).

Conventional MVA-LCD panels include an active element array substrate, an opposite substrate, and a liquid crystal layer disposed between the two substrates. A pixel electrode may be formed on one side of the active element array substrate and a common electrode layer may be formed on one side of the opposite substrate. Furthermore, a first polarizing film is disposed on the side of the active element array substrate opposite the pixel electrode and a second polarizing film is disposed on the side of the opposite substrate opposite the common electrode layer. Generally, in the absence of an electric field, the liquid crystal molecules in the liquid crystal layer align perpendicular to the two substrates. But when an electric field is applied between the two electrodes, the liquid crystal molecules tilt.

FIGS. 1A and 1B depict top views of a pixel electrode 110 and a common electrode layer 120 respectively of a single pixel unit in a conventional MVA-LCD panel. Referring to FIG. 1A, in addition to illustrating the pixel electrode 110, a scan line, a data line, and an active element (all unnumbered) are also illustrated. In practice, the pixel electrode, scan line, data line, and active element may be formed on the active element array substrate. But to show the relative positions of these components with respect to the common electrode layer 120, the scan line, data line, and active element are also illustrated in FIG. 1B. Although polarizing films are not shown in FIGS. 1A and 1B, FIG. 1A (and FIGS. 1C and 2) does show the transmission axis for the first and second polarizing films, which are in the X and Y directions, respectively.

In the conventional MVA-LCD panel, the pixel electrode 110 (FIG. 1A) has a plurality of main slits 112 and a plurality of fine slits 114, and the common electrode layer 120 (FIG. 1B) also has a plurality of main slits 122 and a plurality of fine slits 124. Because the directions of the electric fields near the main slits 112, 122 and the fine slits 114, 124 are different from other portions of the pixel, the direction of inclination of the liquid crystal molecules will have more variations. Thus, the viewing angle of the liquid crystal panel is improved. Dark streaks, however, may form in the areas R10 and R12.

For example, referring to the FIG. 1A, the edge of the pixel electrode 110 in the areas R10 and R12 are straight lines that extend in a direction that is different from the direction that the main slits 112 and the fine slits 114 extend. Thus, the forces acting on the liquid crystal molecules 130 in these areas are in different directions, which prevent them from being driven in a suitable direction. The forces exerted on the liquid crystal molecules 130 within the area R12 are illustrated in FIG. 2. For example, the edge of the pixel electrode 110 exerts the force at F12 on the liquid crystal molecules 130 and the fine slits 114 exert the force at F14 on the liquid crystal molecules 130. Because the forces at F12 and F14 are in different directions, the liquid crystal molecules 130 in the area R12 are not driven in the desired direction F14. Thus, dark streaks are likely to occur in this area. Although FIG. 2 shows the forces exerted on the liquid crystal molecules 130 in the area R12, a similar problem with forces that are exerted in different directions occurs in the areas R10, which may also result in dark streaks.

To address the problem of dark streaks, auxiliary-slits 126 are formed in the common electrode layer 120. As is shown in FIG. 1B, the auxiliary-slits 126 are formed in the areas R10 and R12 and they are parallel to the edge of the pixel electrode 110. Because the force exerted on the liquid crystal molecules in the area R12 by the auxiliary-slit 126 (FIG. 2 at F16) points to the positive X direction and the force F12 points to the negative X direction, the resulting force acting on the liquid crystal molecules 130 is closer to the direction of the force F14. Thus, the probability of generating dark streaks in area R12 (and areas R10) is lowered.

In the process of manufacturing an MVA-LCD panel, the pixel electrode 110 and common electrode layer 120 are formed separately on the two substrates. Thereafter, the two substrates are aligned and assembled so the pixel electrode 110 and the common electrode layer 120 are disposed to face each other as is shown in FIG. 1C. If, however, the pixel electrode 110 and the common electrode layer 120 are not properly aligned during MVA-LCD panel assembly, dark streaks may still appear because the auxiliary-slits 126 do not produce the desired effect on the liquid crystal molecules within the areas R10 and R12. As a result, the display quality (such as the transmittance and response time) of the multi-domain vertical alignment liquid crystal display panel will be substantially compromised.

Accordingly, there is a need for a multi-domain vertical alignment liquid crystal display panel that resolves display quality deterioration problems.

DETAILED DESCRIPTION

Figure 3:
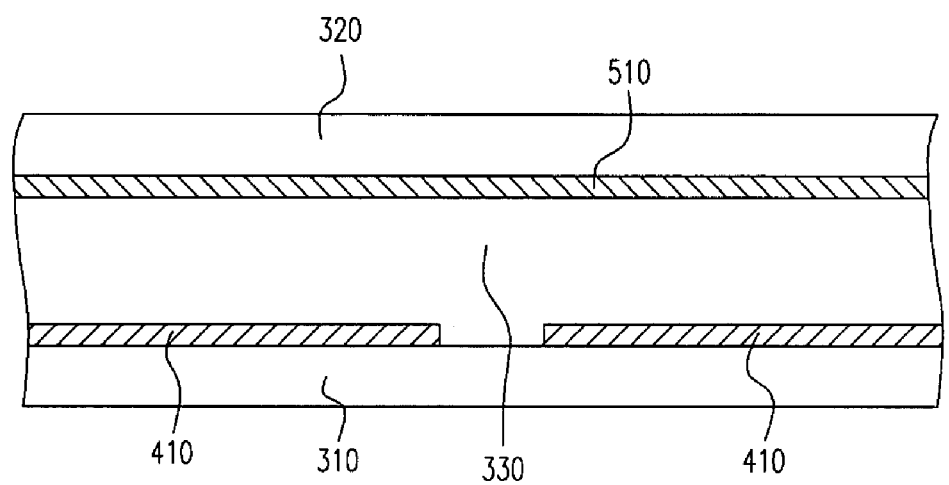
FIG. 3 is a partial cross-section of a multi-domain vertical alignment liquid crystal display panel according an embodiment of the present invention.

Referring to FIG. 3, a multi-domain vertical alignment (MVA) liquid crystal display (LCD) panel 300 may include an active element array substrate 310, an opposite substrate 320, and a liquid crystal layer 330 disposed between the two substrates 310 and 320. A pixel electrode 410 may be formed on the active element array substrate 310 and a common electrode layer 510 may be formed on the opposite substrate 320. The active element array substrate 310 may also have a plurality of parallel scan lines, a plurality of parallel data lines, a plurality of active elements, and a plurality of pixel electrodes formed thereon. The plurality of parallel scan lines and plurality of parallel data lines overlap to define a plurality of pixel areas on the MVA-LCD panel. The opposite substrate 320 may be a color filter substrate. Alternatively, color filter films (not shown) can be formed on the active element array substrate 310. According to some embodiments of the present invention, dark streak problems in the MVA-LCD panel may be avoided or minimized by using a pixel electrode and/or common electrode layer having a special layout of slits.

Figure 4:
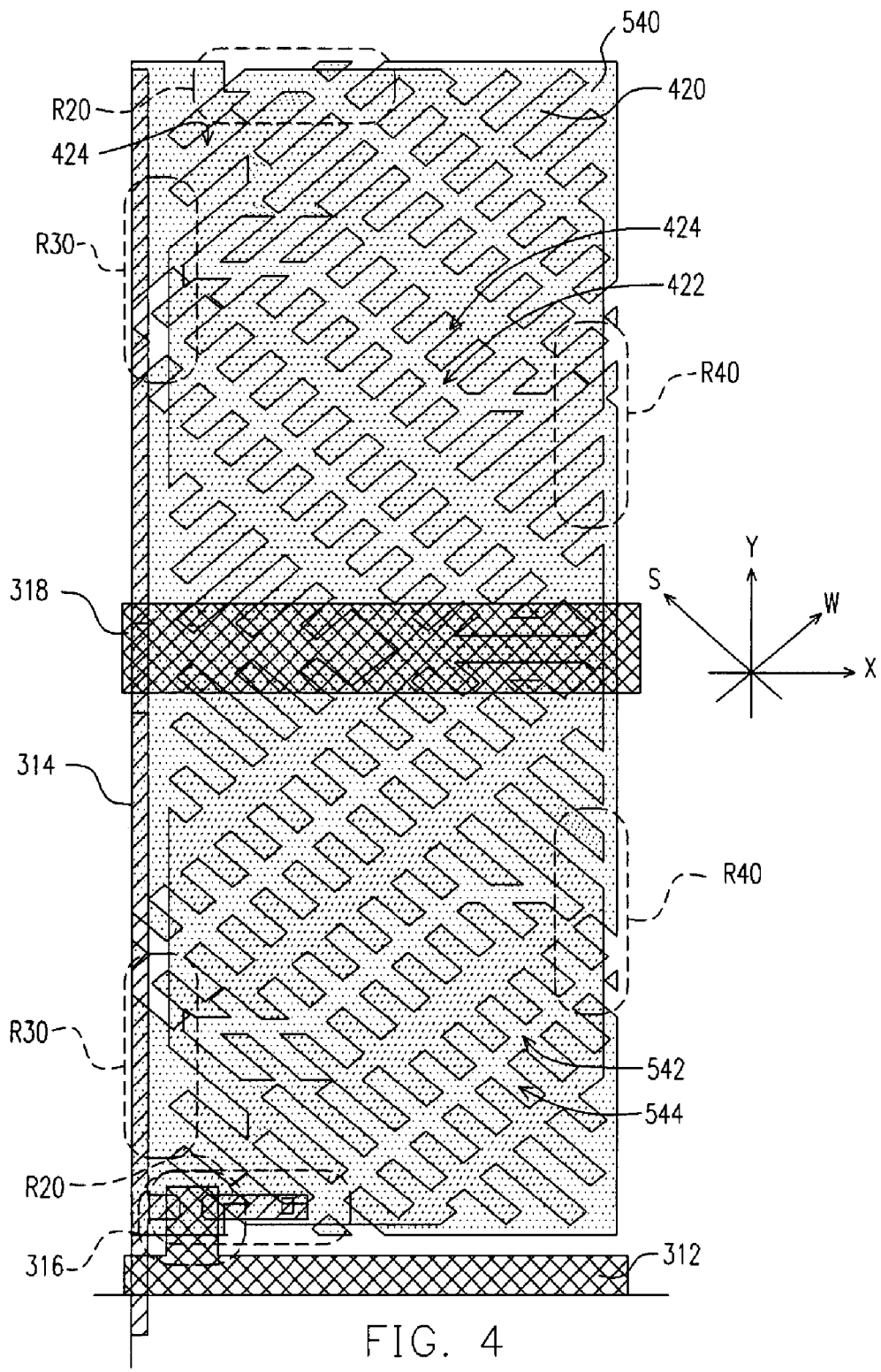
FIG. 4 is a top view of a portion of a multi-domain vertical alignment liquid crystal display panel according to some embodiments.

Referring to FIG. 4, a single pixel area is illustrated. Lines S, W, X, and Y are drawn next to the depicted pixel area. Note that these lines are also shown in other figures. A scan line 312 is arranged in the X direction and a data line 314 is arranged in the Y direction to define the exemplary pixel area of FIG. 4. Although only one pixel area is shown in FIG. 4 (and other figures), MVA-LCD panels typically include a plurality of pixel areas. In some embodiments, each pixel area has an active element 316 and a pixel electrode 420 electrically connected to the active element 316. The active element 316 can be a thin film transistor (TFT) or other suitable active element. Generally, the scan line 312 drives the active element 316 and the pixel electrode 420 receives signals from the data line 314 via the active element 316. As is shown in FIG. 4, a common electrode 318 may also be formed on the active element array substrate to form a pixel storage capacitor in the pixel area. The common electrode layer 540 is formed on the opposite substrate 320. When an electric field is applied between the pixel electrode 420 and the common electrode layer 540, the liquid crystal molecules 230 (FIG. 5B) in the liquid crystal layer 330 (FIG. 3) rotate.

For descriptive purposes only, figures may be described as having an "upper" area and a "lower" area. Of course, the terms "upper" and "lower" and other descriptive terms are merely descriptive of one possible orientation. Other orientations are possible, even probable; thus, descriptive terms used herein are not intended to be limiting unless indicated otherwise.

Figure 5A:
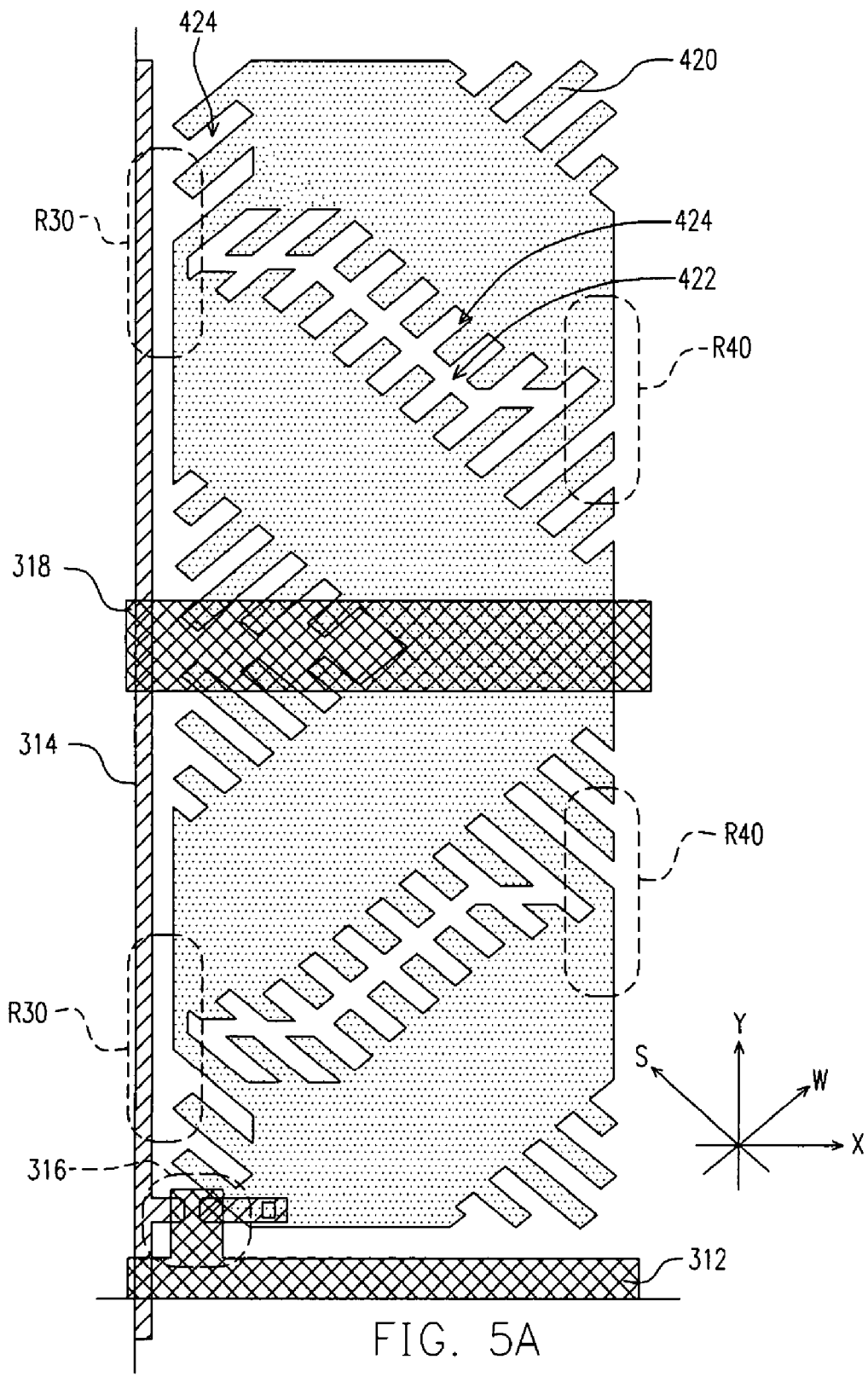
FIG. 5A is a top view of the pixel electrode in FIG. 4.

Referring to FIG. 5A, the pixel electrode 420 of FIG. 4 is shown. The scan line 312, data line 314, and the active element 316 of FIG. 4 are also illustrated in FIG. 5A to show the relative locations between these components and the pixel electrode 420. As is shown in FIG. 5A, the pixel electrode 420 has a plurality of first main slits 422. In some embodiments, the first main slits 422 are enclosed, although embodiments are not so limited. Furthermore, in some embodiments, the first main slits 422 may have a bent design to take on a Z-like or S-like configuration. For example, in the upper area of FIG. 5A the first main slit has a Z-like appearance with a central portion substantially extending in the S direction (see lines S, W, X, and Y) and two end portions substantially extending in the X direction. Likewise, in the lower area of FIG. 5A the first main slit 422 has an S-like appearance with the center portion substantially extending in the W direction and the two end portions extending substantially in the X direction. The bent portions of the first main slits 422 are proximate to edge areas of the pixel electrode 420 labeled R30 and R40. The bent portions of the first main slits 422 are also close to data lines 314. Notably, these bent portions are substantially perpendicular to the data lines 314.

The straight edges of the pixel electrode 420 in the areas R30 and R40 are minimized due to the bends in the first main slits 422 that are near the data lines 314. Hence, the dark streak problem due to inappropriate arrangement of the liquid crystal molecules in the areas R30 and R40 is avoided. Furthermore, the bends in the portions of the first main slits 422 that are close to the data lines 314, also help to resolve the dark streak problem in the areas R30 and R40 when errors occur during subsequent alignment of the pixel electrode 420 and the common electrode layer 540 (not shown).

Still referring to FIG. 5A, the pixel electrode 420 may also include first fine slits 424; a subset of first fine slits 424 may be connected to the first main slits 422 although embodiments are not so limited. In some embodiments, the first fine slits 424 in the upper area of FIG. 5A are substantially extending in the W direction and the first fine slits 424 in the lower area are substantially extending in the S direction.

Figure 6:
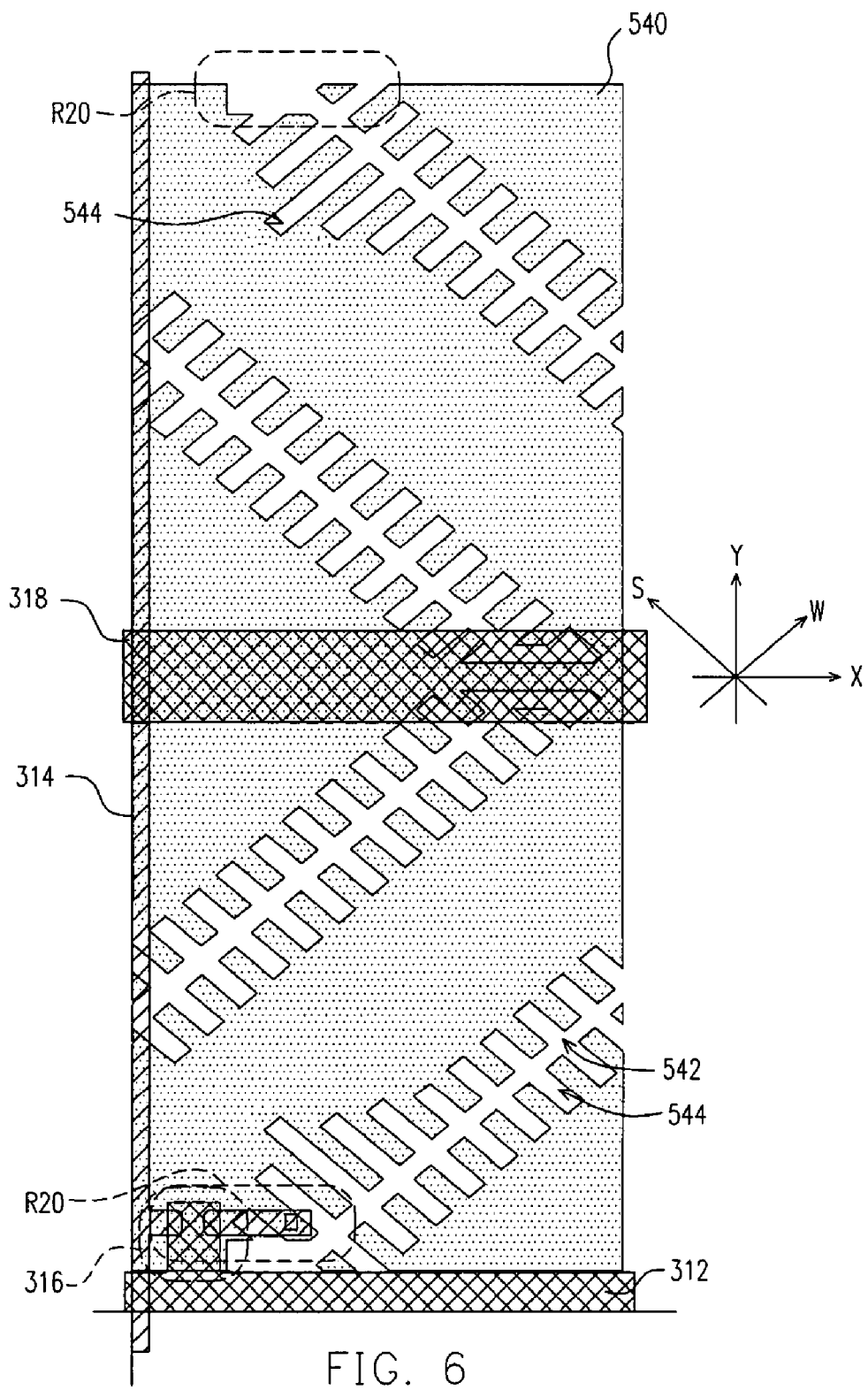
FIG. 6 is a top view of the common electrode layer in FIG. 4.

The common electrode layer 540 of FIG. 4 is illustrated in FIG. 6. Although the scan line 312, the data line 314, and the active element 316 are typically formed on the active element array substrate, these components are also illustrated in FIG. 6 to show their relative locations with respect to the common electrode layer 540. As is shown in the figure, the common electrode layer 540 includes second main slits 542 and second fine slits 544. In some embodiments, the second main slits 542 are opened slits although embodiments are not so limited.

Referring to FIGS. 4, 5A, and 6, the bends in the end portions of the first main slits 422 of the pixel electrode 420 that are near the scan lines 312 or the data lines 314 weaken the controlling force exerted on the liquid crystal molecules between the areas R20 (FIGS. 4 and 6) and the area R30 (FIGS. 4 and 5A). A subset of the second fine slits 544 of the common electrode layer 540, however, are distributed between the areas R20 and R30 to provide a better controlling force on the liquid crystal molecules in these areas. Similarly, a subset of first fine slits 424 of the pixel electrode 420 are distributed between the areas R20 and R30. Consequently, the display quality can be improved.

Figure 5B:
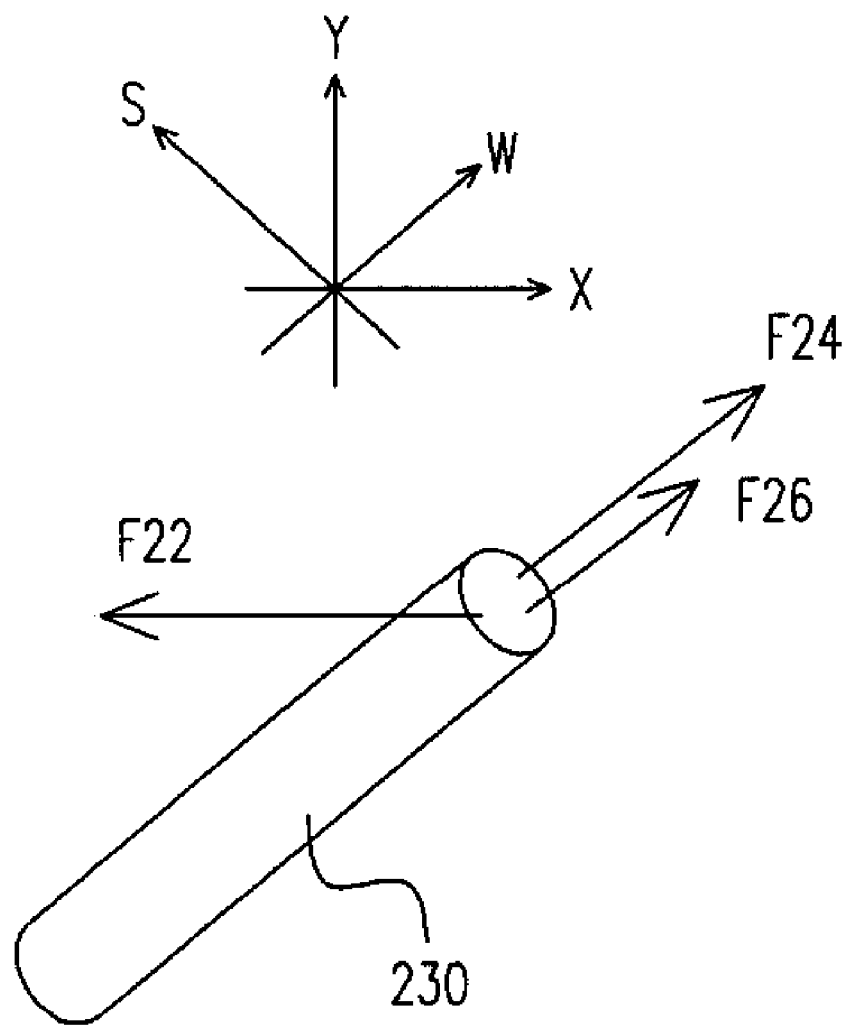
FIG. 5B is a diagram showing the forces exerted on the liquid crystal molecules in the upper area R40 of FIG. 4.

Referring to FIG. 5B, the forces exerted on the liquid crystal molecules 230 in the upper area R40 of FIG. 4 are described. For example, the force F22 is applied to the liquid crystal molecules 230 by the edge of the pixel electrode 420 within the upper area R40. Furthermore, within the upper area R40, the force F24 is applied to the liquid crystal molecule 230 by the first fine slits 424 of the pixel electrode 420 and the force F26 is applied to the liquid crystal molecules 230 by the second fine slits 544 of the common electrode layer 540. The forces F24 and F26 point in the positive W direction and the force F22 points in the negative X direction. Therefore, the resultant force acting on the liquid crystal molecules 230 is closer to the W direction so that the liquid crystal molecules 230 have a similar alignment with the liquid crystal molecules in other areas in the same domain, thereby reducing the probability of having dark streaks. Although the forces with respect to upper area R40 are described, it should be understood that the forces acting on the liquid crystal molecules in the areas R20, R30, and lower R40 also allow for proper alignment to avoid dark streaks.

Figure 7:
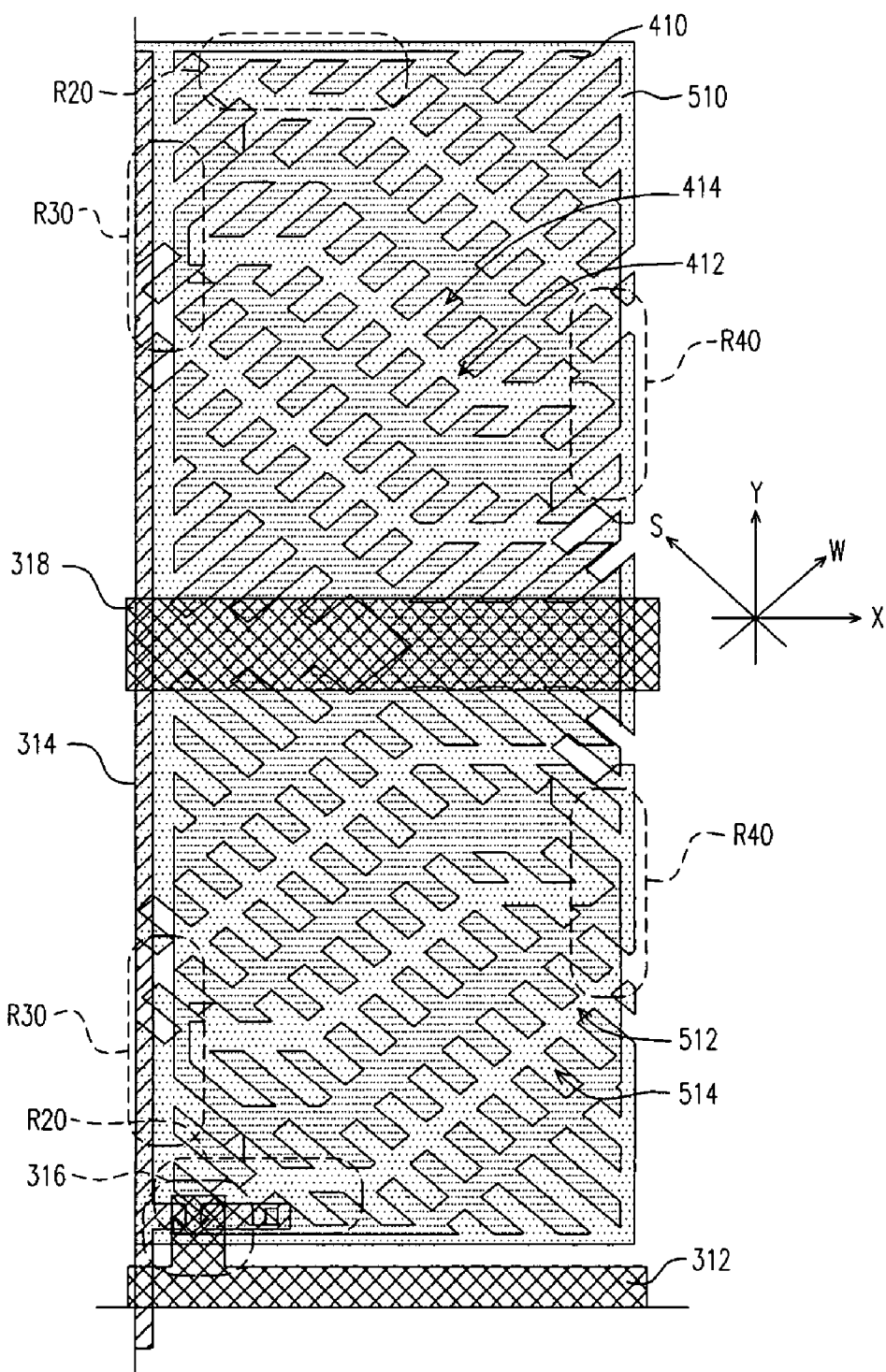
FIG. 7 is a top view of a portion of a multi-domain vertical alignment liquid crystal display panel according to another embodiment.
Figure 8:
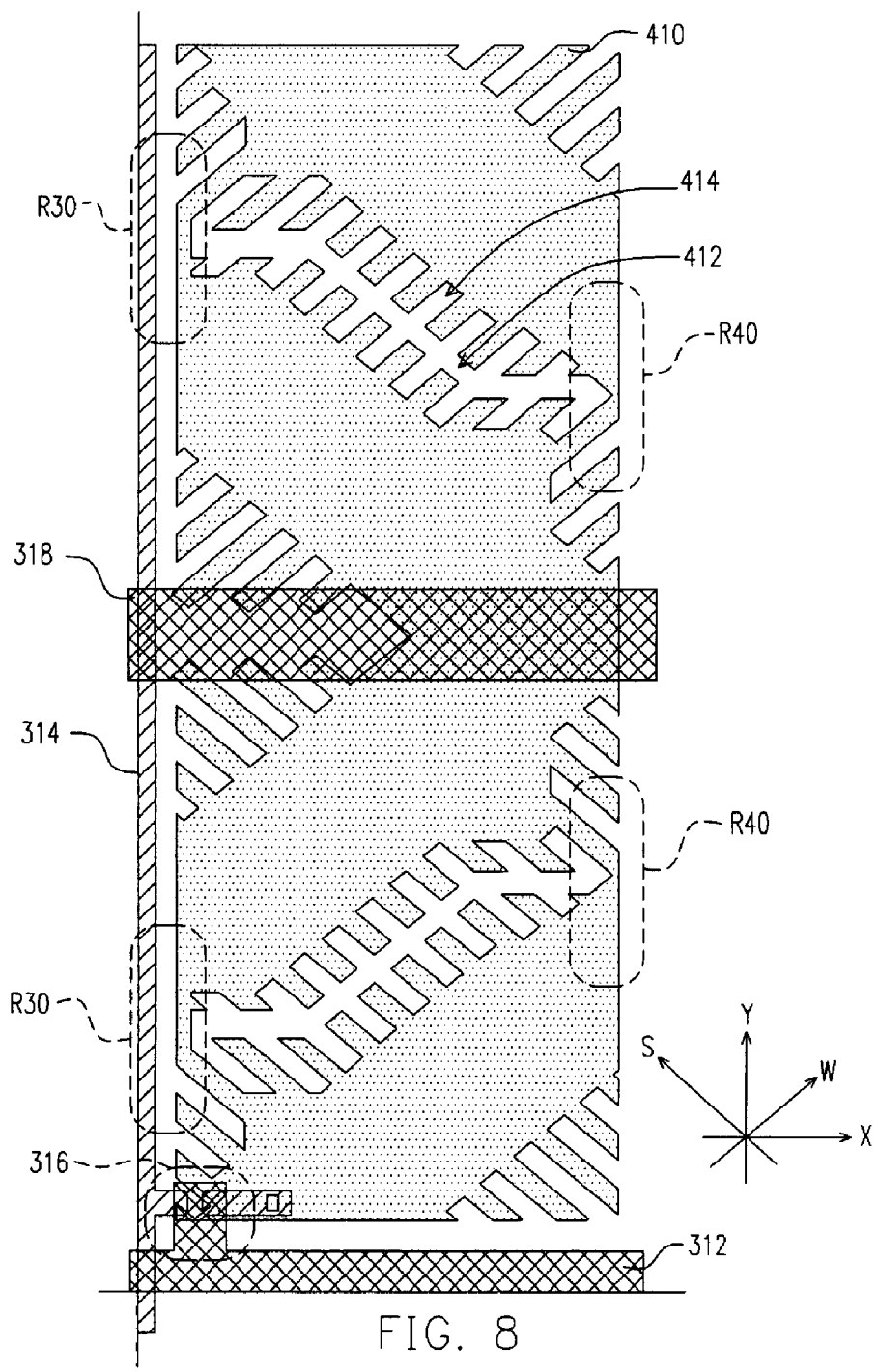
FIG. 8 is a top view of the pixel electrode in FIG. 7.
Figure 9:
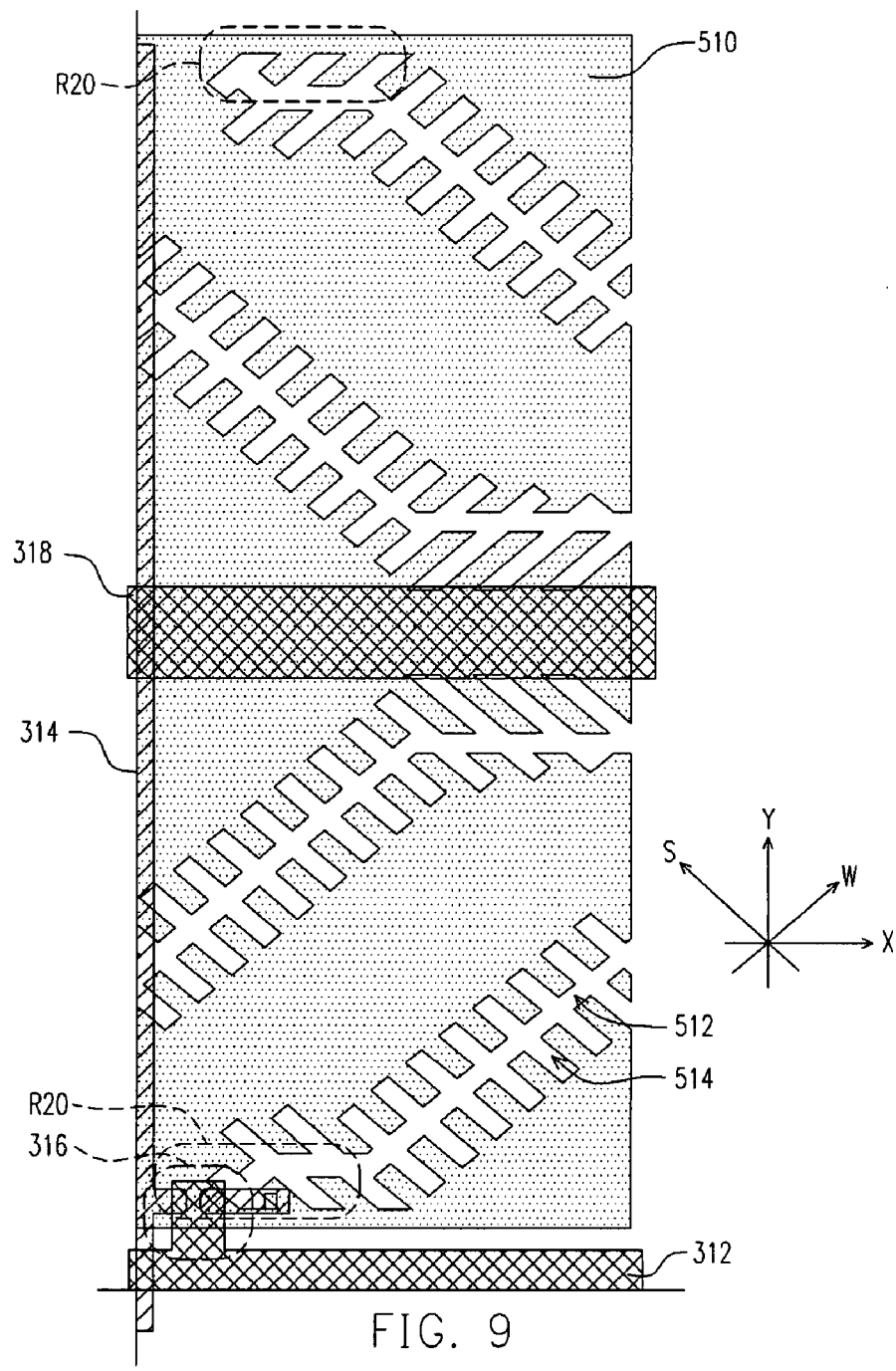
FIG. 9 is a top view of the common electrode layer in FIG. 7.

Referring to FIGS. 7, 8, and 9, some embodiments of the MVA-LCD panel include a pixel electrode that is similar to the pixel electrode 420 shown in FIGS. 4 and 5A. For example, as is shown in FIGS. 7 and 8, the first main slits 412 of the pixel electrode 410 have bent configurations similar to that of the first main slits 422 on the pixel electrode 420. Some of the first fine slits 414 in the pixel electrode 410, however, may be configured slightly differently than the first fine slits 424 in the pixel electrode 420. The common electrode layer 510, which is shown in FIGS. 7 and 9, differs, however, from the common electrode layer 540 of FIGS. 4 and 6. For instance, the common electrode layer 510 has second main slits 512 that bend, at least one of second main slits 512 having a bend near a scan line 312. The bent portions of the second main slits 512 are substantially extending in the X direction. That is, in the upper area of FIG. 9, one portion of the second main slits 512 is substantially extending in the S direction and in the lower area of the figure, one portion of the second main slits 512 is substantially extending in the W direction. But other bent portions of the second main slits 512 in both the upper and lower areas are substantially extending in the X direction. Because the portions of the second main slits 512 near the scan lines 312 have a bent design, dark streaks due to inappropriate alignment of the liquid crystal molecules in the areas R20 can still be avoided. Note that in FIG. 9 the scan line 312, the data line 314, and the active element 316 are also depicted to illustrate the relative locations between these components and the common electrode layer 510. In practice, however, scan lines 312, data lines 314, and active elements 316 are formed on the active element substrate.

Figure 1A:
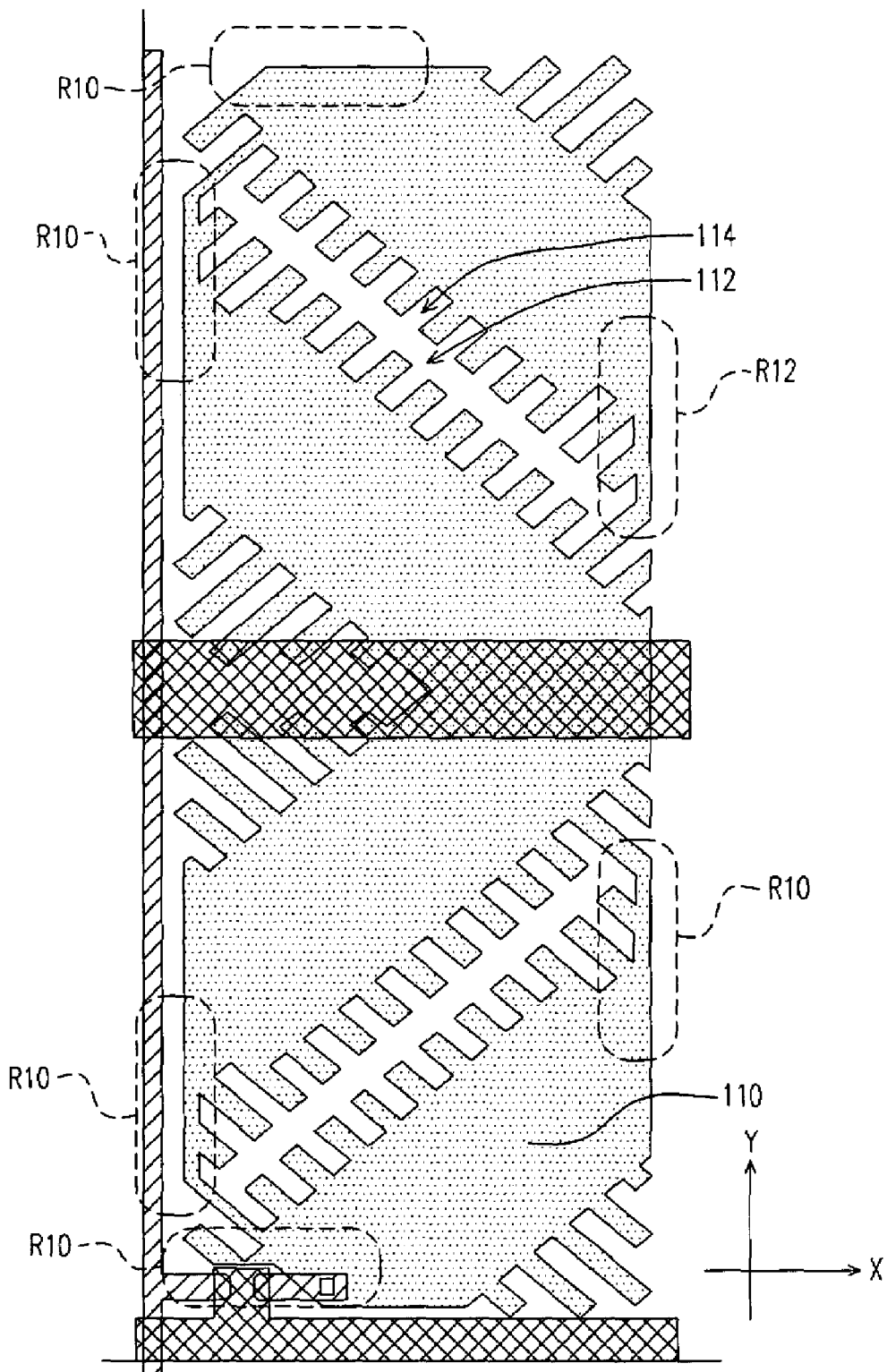
FIG. 1A is a top view of a pixel electrode in a conventional multi-domain vertical alignment liquid crystal display (MVA-LCD) panel.
Figure 1B:
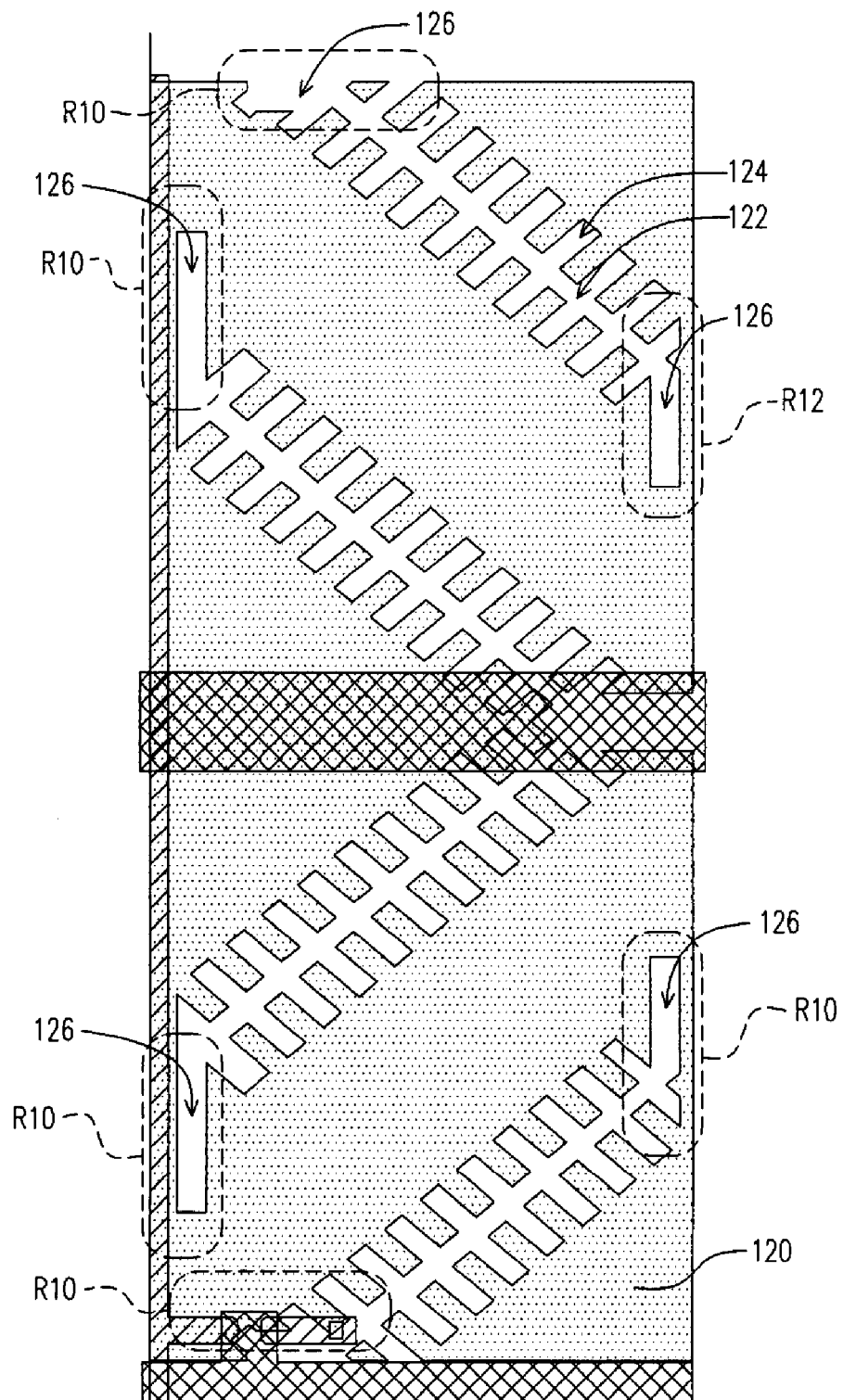
FIG. 1B is a top view of a common electrode layer of a conventional MVA-LCD panel.
Figure 1C:
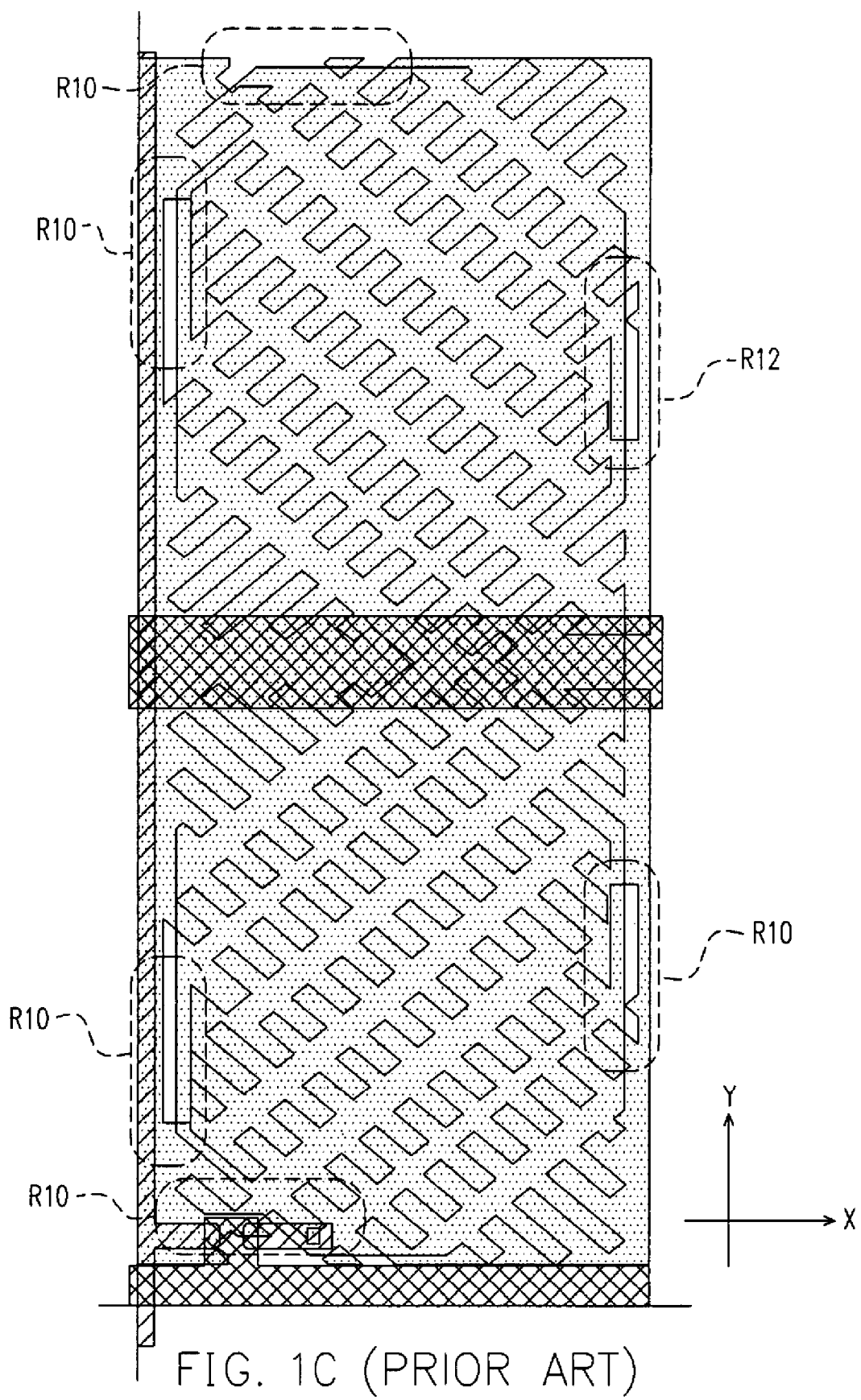
FIG. 1C is a top view of the conventional MVA-LCD panel after the pixel electrode in FIG. 1A and the common electrode in FIG. 1B are stacked together.
Figure 2:
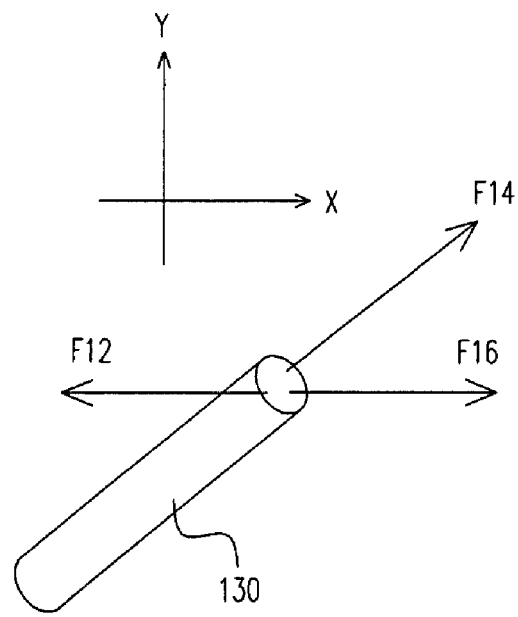
FIG. 2 is a diagram showing the forces acting on liquid crystal molecules in the area R12 of the conventional MVA-LCD panel.

The common electrode layer 510 illustrated in FIG. 9 also includes second fine slits 514. In some embodiments, at least some of the second fine slits 514 are connected to the second main slits 512, although embodiments are not so limited. In the upper area of FIG. 9 the second fine slits 514 are substantially extending in the W direction, whereas in the lower area the second fine slits 514 are substantially extending in the S direction. Comparing the common electrode layer 510 to the common electrode layer 120 of the conventional MVA-LCD (FIG. 1B), there are more second fine slits 514 in the area R20 of the common electrode layer 510 than there are fine slits 124 in the area R10 on the conventional common electrode layer 120. The presence of the additional second fine slits 514 on the common electrode layer 510 helps to avoid dark streaks in the areas R20 even if errors occur in the alignment of the common electrode layer 510 and the pixel electrode (not shown). Furthermore, referring to FIG. 7, when the pixel electrode 410 (FIG. 8) is combined with the common electrode layer 510 (FIG. 9), the advantage of avoiding dark streaks in the areas R20, R30, and R40 may be exhibited.

Figure 10:
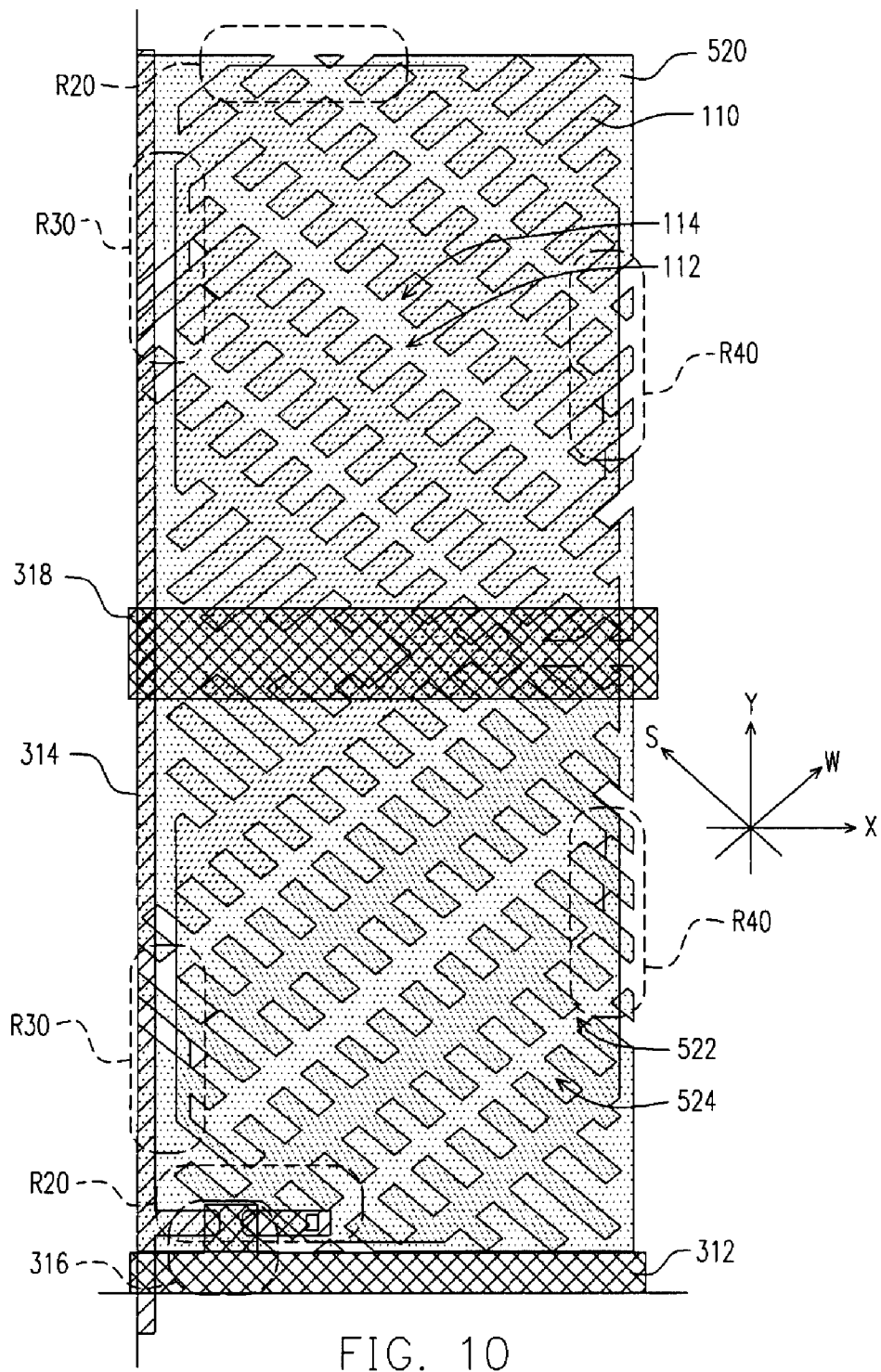
FIG. 10 is a top view of a portion of a multi-domain vertical alignment liquid crystal display panel according to another embodiment.
Figure 11:
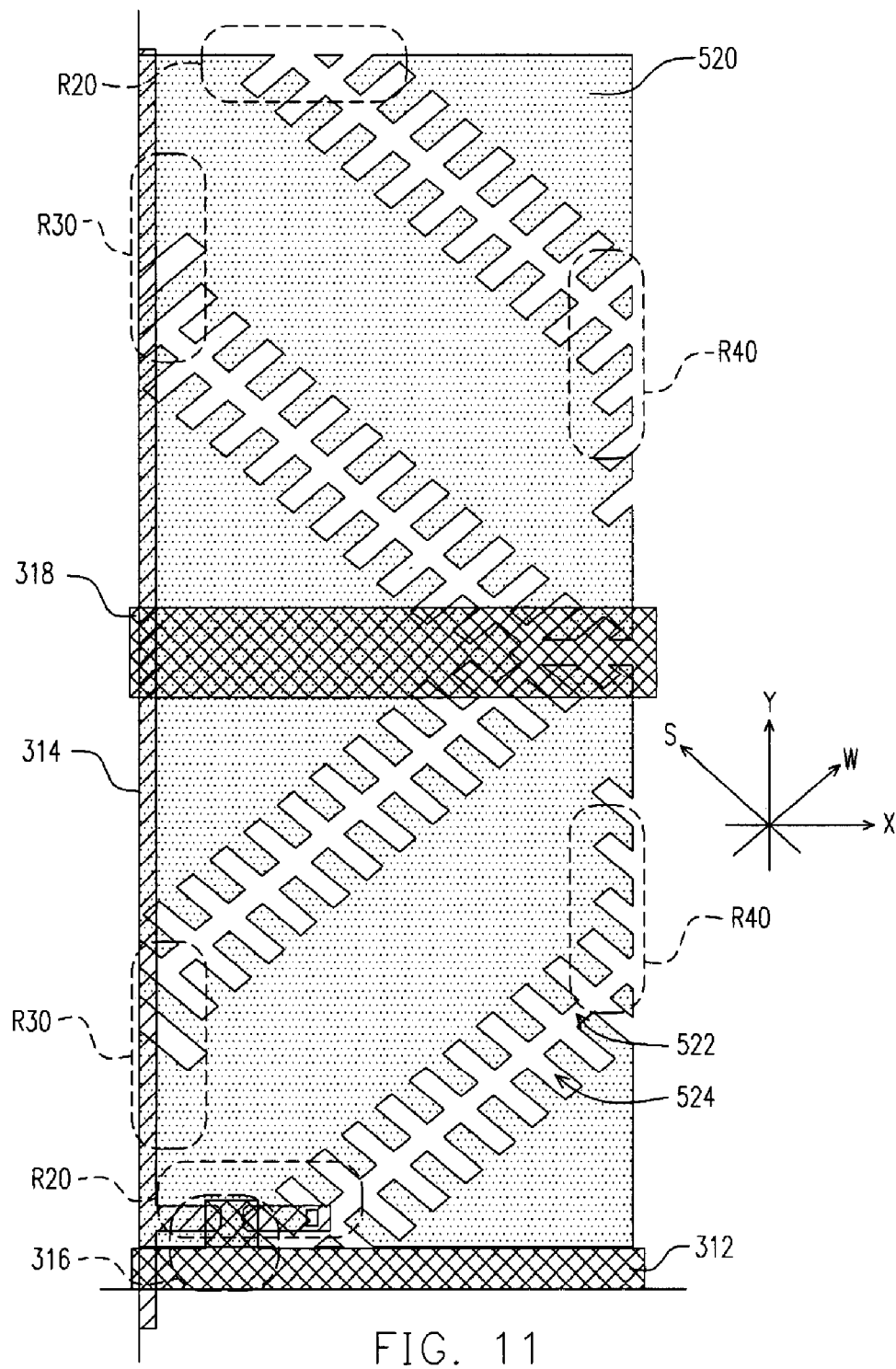
FIG. 11 is a top view of the common electrode layer in FIG. 10.

As is shown in FIG. 10, in some embodiments the conventional pixel electrode 110 (FIG. 1A) is combined with a specially designed common electrode layer 520. An embodiment of a specially designed common electrode layer 520 is illustrated in FIG. 11 together with scan line 312, data line 314, and active element 316 to show the relative locations between these components. As with other embodiments of common electrode layer, the common electrode layer 520 has second main slits 522 and second fine slits 524. The second main slits 522 in the upper area of FIG. 11 are substantially extending in the S direction, whereas the second main slits 522 in the lower area are substantially extending in the W direction. As with other embodiments, the common electrode layer 520 may have second fine slits 524 that are arranged along the second main slits 522. A portion of the second fine slits 524, however, may be arranged in parallel along an area of the common electrode layer 520 that corresponds to the edge of the pixel electrode 110. That is, referring to FIGS. 10 and 11, a subset of second fine slits 524 may be arranged in areas R20, R30, and R40. Thus, any dark streaks that may occur are confined to one side of the scan line 314 and the data line 312; the dark streaks should not appear in the remaining portions because the second fine slits 524 constrain the liquid crystal molecules. Hence, the goal of boosting the display quality may be achieved. Furthermore, if there are errors in the alignment of the common electrode layer 520 and the pixel electrode 110 (not drawn), dark streaks may be confined to the edge of the pixel areas due to the second fine slits 524 in the areas R20, R30, and R40.

Figure 12:
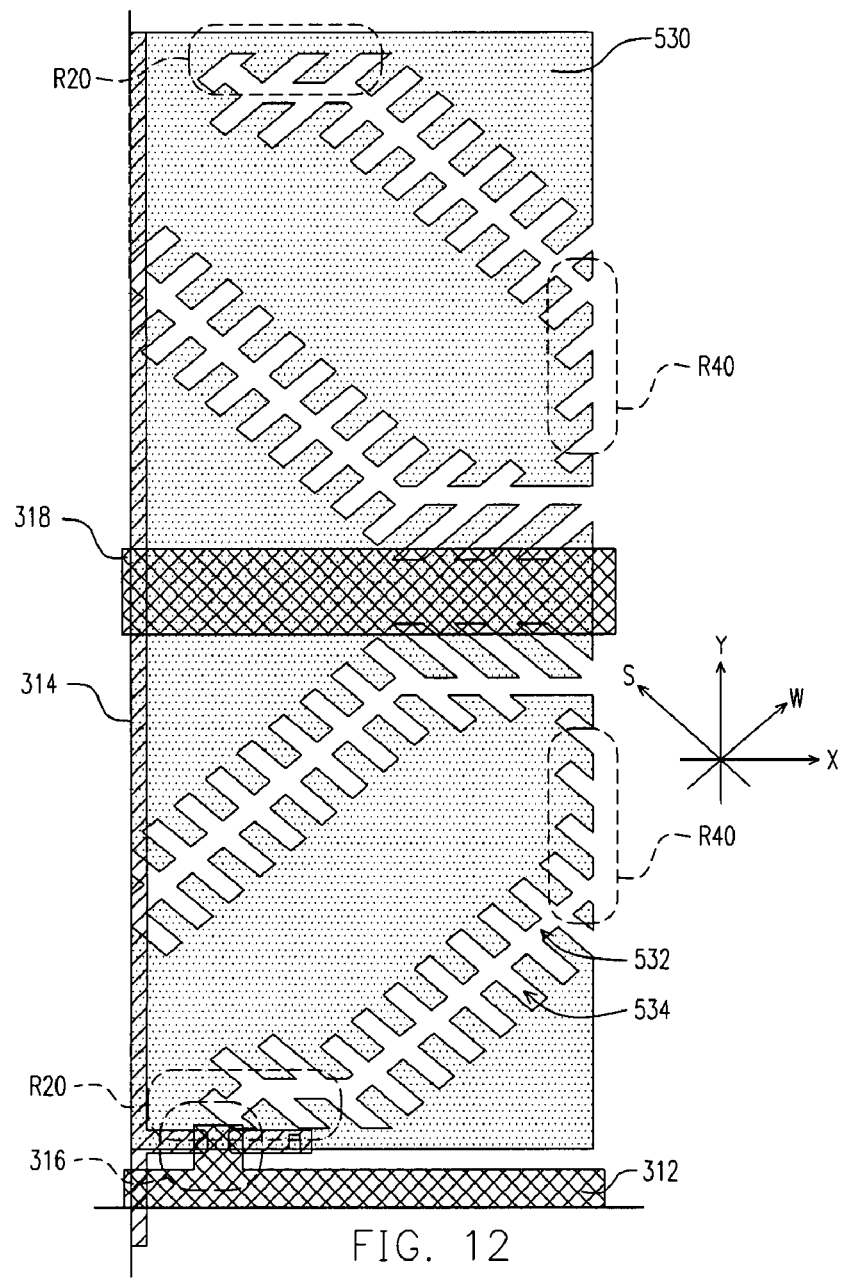
FIG. 12 is a top view of a common electrode layer of a portion of a multi-domain vertical alignment liquid crystal display panel according to some embodiments.

FIG. 12 illustrates an alternate embodiment of a common electrode layer 530 of a single pixel area. The scan line 312, the data line 314, and the active element 316 are also drawn in FIG. 12 to show the relationships between these components and the common electrode layer 530. In some embodiments, the common electrode layer 530 has second main slits 532 and second fine slits 534. The second main slits 532 may have bent configurations similar to that of the second main slits 512 described above in connection with FIGS. 7 and 9. Furthermore, the second main slits 532 may be combined with parallel second fine slits 534 similar to the parallel fine slits 524 described above in connection with FIGS. 10 and 11. Therefore, dark streaks due to the inappropriate alignment of the liquid crystal molecules in the area R20 of the common electrode layer 530 are avoided; dark streaks may be confined to one side of the data lines 312 in the area R40. Hence, the goal of improving display quality is achieved and the design is effective even if errors in the alignment process occur.

Embodiments of the common electrode layer of the multi-domain vertical alignment liquid crystal display may have any one or more of the designs illustrated in the area R20 of FIG. 9, the areas R30 and R40 of FIG. 11, and the area R20 of FIG. 6. In other words, the designs illustrated herein are non-limiting; they can be used as shown or in combination.

Furthermore, it should be noted that a limited number of combinations of the pixel electrode and the common electrode layer have been illustrated herein. There are, however, many other embodiments having combinations of a pixel electrode and a common electrode layer that may not have been illustrated herein such as the combination of the pixel electrode 420, which is shown in FIG. 5A, with any of the embodiments of a common electrode layer illustrated in FIGS. 6, 9, 11, or 12. Moreover, the pixel electrode shown in FIGS. 5A and 8 can be matched up with a conventional common electrode layer. Similarly, the common electrode layers shown in FIGS. 6, 9, 11, and 12 can be matched up with a conventional pixel electrode.

In summary, to improve the display quality of the multi-domain vertical alignment liquid crystal display panel, thee portion of main slits in the pixel electrode that are near data lines may have a bend to reduce the straight edge of the pixel electrode. Additionally or alternatively, the portions of the main slits in the common electrode layer that are near scan lines may have a bend. Furthermore, a plurality of second fine slits can be arranged on the common electrode layer along the area corresponding to the edge of the pixel electrode.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A multi-domain vertical alignment liquid crystal display panel, comprising:
    an active element array substrate having a plurality of parallel scan lines and a plurality of parallel data lines, the data lines and the scan lines overlapping to define a plurality of pixel areas, each pixel area including an active element and a pixel electrode electrically connected to the active element, the pixel electrode having a plurality of bent first main slits, each bent first main slit having a first portion that is inclined with respect to the data line and a second portion connected to the first portion and near the data line, the second portion substantially perpendicular to the data line;
    an opposite substrate having a common electrode layer that faces the active element array substrate; and
    a liquid crystal layer, disposed between the active element array substrate and the opposite substrate.

2. The multi-domain vertical alignment liquid crystal display panel of claim 1, wherein portions of common electrode layer corresponding to the pixel areas each have a plurality of second main slits and a plurality of second fine slits.

3. The multi-domain vertical alignment liquid crystal display panel of claim 2, wherein portions of the second main slits near the scan lines have a bend.

4. The multi-domain vertical alignment liquid crystal display panel of claim 3, wherein at least one subset of the plurality of second fine slits is connected to the second main slits.

5. The multi-domain vertical alignment liquid crystal display panel of claim 2, wherein one subset of the plurality of second fine slits are arranged along the second main slits and another subset of the plurality of second fine slits are arranged along an area of the common electrode layer corresponding to the edge of the pixel electrode.

6. The multi-domain vertical alignment liquid crystal display panel of claim 2, wherein a subset of the plurality of second fine slits is connected to the second main slits.

7. The multi-domain vertical alignment liquid crystal display panel of claim 1, wherein the pixel electrode further comprises a plurality of first fine slits, a subset of said plurality of first fine slits connected to the first main slits.

8. The multi-domain vertical alignment liquid crystal display panel of claim 1, wherein the first main slit has two second portions, one of said two second portions connected to the first portion at one end, the other of said two second portions connected to the first portion at the other end.

9. The multi-domain vertical alignment liquid crystal display panel of claim 8, wherein the first main slits are enclosed slits.

10. A multi-domain vertical alignment liquid crystal display panel, comprising:
    an active element array substrate having a plurality of parallel scan lines, and a plurality of parallel data lines, the scan lines are arranged in a first direction and the data lines are arranged in a second direction, the data lines and the scan lines to define a plurality of pixel areas, each pixel area including an active element and a pixel electrode electrically connected to the active element;
    an opposite substrate having a common electrode layer, portions of the common electrode layer to correspond to the pixel areas, each portion of the common electrode layer including a plurality of second main slits, at least one of the second main slits having a portion that is bent to be substantially parallel to one of the scan lines; and
    a liquid crystal layer, disposed between the active element array substrate and the opposite substrate,
    wherein the common electrode layer further comprises a plurality of second fine slits, a subset of the plurality of seconed fine slots arranged along the second main slits.

11. The multi-domain vertical alignment liquid crystal display panel of claim 10, wherein the pixel electrode has a plurality of first main slits and a plurality of first fine slits.

12. The multi-domain vertical alignment liquid crystal display panel of claim 11, wherein at least a subset of first fine slits is connected to the first main slits.

13. The multi-domain vertical alignment liquid crystal display panel of claim 12, wherein the first main slits are enclosed slits.

14. The multi-domain vertical alignment liquid crystal display panel of claim 10, wherein another subset of the plurality of second fine slits is arranged along the area of the common electrode layer corresponding to the edge of the pixel electrode.

15. A multi-domain vertical alignment liquid crystal display panel, comprising:
    an active element array substrate having a plurality of parallel scan lines and a plurality of parallel data lines, the scan lines are arranged in a first direction, and the data lines are arranged in a second direction other than the first direction, the data lines and the scan lines to define a plurality of pixel areas, each pixel area including an active element driven by a corresponding scan line and a pixel electrode electrically connected to the active element to receive a signal transmitted through a corresponding data line;
    an opposite substrate having a common electrode layer that faces the active element array substrate, portions of the common electrode layer corresponding to the pixel areas, each common electrode layer portion having a plurality of second main slits and a plurality of second fine slits, a subset of second fine slits arranged along the second main slits and another subset of second fine slits arranged along an area of the common electrode layer corresponding to the edge of the pixel electrode; and
    a liquid crystal layer, disposed between the active element array substrate and the opposite substrate.

16. The multi-domain vertical alignment liquid crystal display panel of claim 15, wherein the pixel electrode has a plurality of first main slits and a plurality of first fine slits.

17. The multi-domain vertical alignment liquid crystal display panel of claim 16, wherein at least a subset of the first fine slits is connected to the first main slits.

18. The multi-domain vertical alignment liquid crystal display panel of claim 15, wherein the first main slits are enclosed slits.

19. The multi-domain vertical alignment liquid crystal display panel of claim 15, wherein each second main slit in said plurality has a first portion and a second portion connected to the first portion, the first portion substantially extending in one direction and the second portion substantially extending in another direction that is at an angle to the first portion.

* * * * *

UNITED STATES PATENT AND TRADEMARK OFFICE
CERTIFICATE OF CORRECTION

| | |
|---|---|
| PATENT NO. | : 7,583,346 B2 |
| APPLICATION NO. | : 11/726108 |
| DATED | : September 1, 2009 |
| INVENTOR(S) | : Mingfent Hsieh et al. |

It is certified that error appears in the above-identified patent and that said Letters Patent is hereby corrected as shown below:

Col. 7:
Line 40, before "common" insert --the--;

Col. 8:
Line 23, "seconed fine slots" should be --second fine slits--.

Signed and Sealed this
Eleventh Day of September, 2012

David J. Kappos
*Director of the United States Patent and Trademark Office*